United States Patent [19]

Haze

[11] Patent Number: 4,553,616
[45] Date of Patent: Nov. 19, 1985

[54] COMBINATORIAL WEIGHING APPARATUS HAVING MEMORY FOR STORING WEIGHING CONDITIONS

[75] Inventor: Setsuo Haze, Shiga, Japan

[73] Assignee: Kabushiki Kaisha Ishida Koki Seisakusho, Kyoto, Japan

[21] Appl. No.: 522,566

[22] Filed: Aug. 12, 1983

[30] Foreign Application Priority Data

Aug. 13, 1982 [JP] Japan ............................ 57-123283[U]

[51] Int. Cl.⁴ ............................................. G01G 19/34
[52] U.S. Cl. ........................................ 177/1; 177/25; 198/761
[58] Field of Search ................. 177/25, 164, DIG. 12, 177/50, 70, 165, 1; 198/761, 762

[56] References Cited

U.S. PATENT DOCUMENTS

| 3,173,505 | 3/1965 | Thorsson et al. | 177/70 |
| 3,251,457 | 5/1966 | Dumbaugh | 198/762 |
| 4,229,794 | 10/1980 | Foster | 177/25 X |
| 4,320,461 | 3/1982 | Dlugos | 177/25 X |
| 4,398,253 | 8/1983 | Karp et al. | 177/25 X |
| 4,398,612 | 8/1983 | Mikami et al. | 177/25 |

Primary Examiner—E. A. Goldberg
Assistant Examiner—Fred L. Kompe
Attorney, Agent, or Firm—Staas & Halsey

[57] ABSTRACT

Weighing conditions, depending on the kind of article being weighed and on the target value for the weighing operation, are entered as a set of reserved values through a data input unit, and the set of reserved values is written into a memory of a storage unit by a write control unit. The storage unit includes a plurality of memories, each of which stores a different set of reserved values. A read control unit, in response to an input from the data input unit, selects a required set of reserved values from the corresponding memory of the storage unit, and applies prescribed ones of these values to a combinatorial computation control unit and feeder drive units. Therefore, when it is necessary to reset weighing conditions whenever there is a change in the kind of article being weighed or in the target value, the resetting operation is performed merely by reading the desired weighing conditions, namely the set of reserved values, from memory.

7 Claims, 6 Drawing Figures

Fig. 6 of the page content:

COMBINATORIAL WEIGHING APPARATUS HAVING MEMORY FOR STORING WEIGHING CONDITIONS

BACKGROUND OF THE INVENTION

This invention relates to a combinatorial weighing apparatus for processing a number of different articles using a variety of different target weights, wherein the conditions necessary for combinatorial weighing are reserved and registered in advance and the reserved values are called from memory whenever a weighing operation is performed, thereby making it unnecessary to set the weighing conditions each time.

A combinatorial weighing apparatus known in the art has a plurality of weighing machines. Combinatorial weighing is carried out by weighing articles which have been supplied to the weighing machines, computing combinations of the obtained weight values, selecting the combination of weighing machines (referred to as the "optimum" combination) that gives a total combined weight value equal to a target weight value or closest to the target weight value within preset allowable limits, discharging only those articles contained by the selected weighing machines, and subsequently replenishing the emptied weighing machines, i.e., those which have discharged their articles, with articles to prepare for the next weighing cycle. The foregoing sequence of steps is repeated to carry out a continuous, highly accurate weighing operation automatically.

Figure 1:
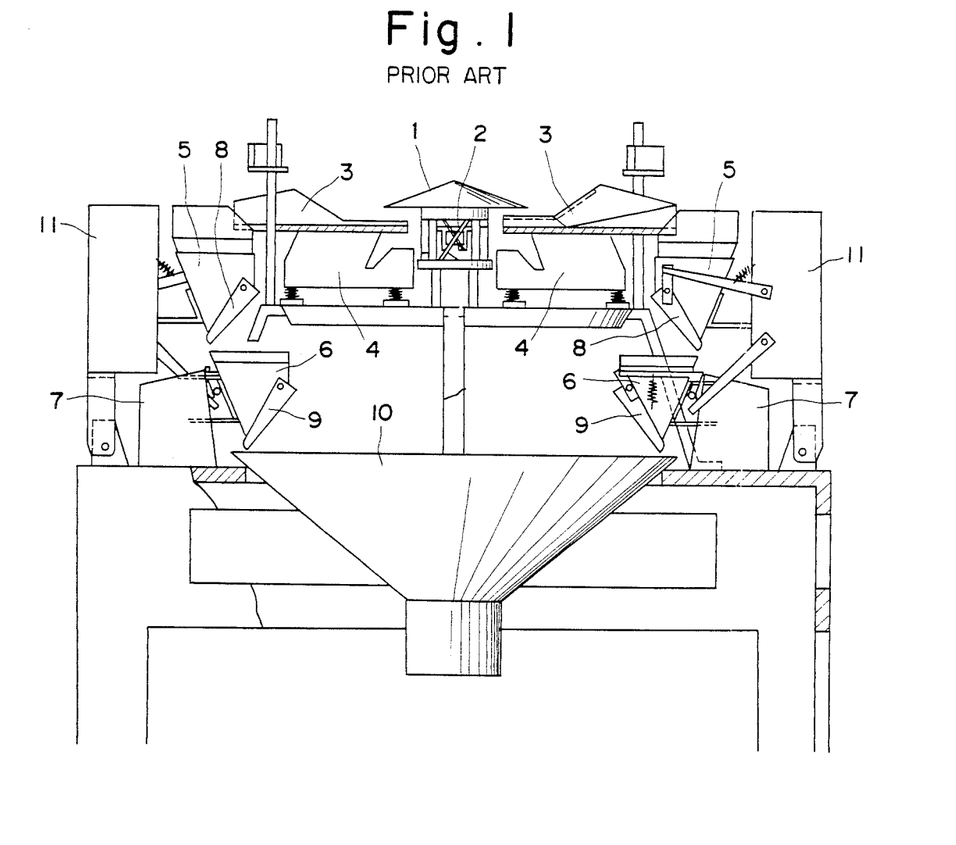
FIG. 1 is a side view, partially in section, of the mechanical structure of a combinatorial weighing apparatus known in the art.

FIG. 1 is a side view, partially in section, of a combinatorial weighing apparatus of the above-described type. Numeral 1 denotes a dispersing feeder for dispersing articles radially outwardly to supply the articles to n-number of radially extending weighing sections arranged around the dispersing feeder 1. The feeder 1, which is of vibratory conveyance type, is caused to rotate back and forth and reciprocate vertically in rapid, oscillatory fashion by a vibrator 2 incorporating an electromagnet, whereby the articles are conveyed distributively to each weighing section.

Each weighing section comprises a supply troughtype feeder 3, a pool hopper 5, a weighing hopper 6, and a weight sensor 7. The weighing hopper 6 and weight sensor 7 in each section constitute a weighing machine.

Each supply trough feeder 3 is vibrated by a vibrator 4 incorporating an electromagnet, so that the articles received from the feeder 1 will migrate along the trough and drop into the corresponding pool hopper 5. Each pool hopper 5 is provided with a pool hopper gate 8 which, when opened, releases the articles from the hopper 5 into the corresponding weighing hopper 6. Each weighing hopper 6 is attached to the corresponding weight sensor 7. The latter measures the weight of the article batch supplied to the weighing hopper and applies the measured weight value to a combinatorial computation control unit (not shown in FIG. 1). The control unit, based on the weight values received from all of the weight sensors 7, computes all possible combinations of the weight values and selects the optimum combination, namely the optimum combination of weighing machines mentioned above. The control unit then delivers an article discharge signal to the selected weighing machines, causing weighing hopper gates 9 of the weighing hoppers 6, corresponding to the selected weighing machines, to open and discharge their articles into a common underlying collecting chute 10. The articles are collected at the bottom central portion of the chute 10 and then delivered to a packaging machine (not shown). Numeral 11 denotes a drive unit for opening and closing the hopper gates 8, 9 of the corresponding weighing section.

In order to prepare for an automatic weighing operation using the above-described combinatorial weighing apparatus, it is necessary to decide the conditions that are to hold for each weighing operation and then enter the relevant numerical values into the control unit of the apparatus using input means such as numeric keys, digital switches or dial switches.

Ordinarily, the entered weighing conditions, namely the set numerical values, constitute at least the following values. First, there is the target weight value (hereinafter referred to as the "target value") serving as the target of the combinatorial weighing operation. Then there are upper and lower limit values which bracket the target value for defining an allowable range within which a total combined weight value obtained from the combinatorial computations must fall, in order to have an acceptable accuracy. Finally, there are values for adjusting the amount of articles supplied to each weighing machine. More specifically, these are values, in the form of numerical codes, that specify the vibration conditions for the distributing feeder 1 and supply trough-type feeders 3, namely the amplitude and duration of vibration.

Adjustment of the amplitude of vibration of the dispersing feeder 1 and supply trough feeders 3 in order to control the amount of articles supplied, is achieved by regulating the magnitude of the current flowing into the electromagnet of each feeder. Adjustment of the duration of vibration of these feeders is performed by a timer. In order to initially set the amplitude and duration of vibration to appropriate values, the prior-art practice is to first set the amplitude and duration of feeder vibration to provisional values by dial switches or the like, and then perform a trial weighing operation by supplying articles on the basis of these set provisional values. It is of course necessary to preset the target value, upper limit value and lower limit value using digital switches. At the end of the combinatorial computations, the number of weighing machines selected as the optimum combination appears on a display. The dial switches are then adjusted in such a manner that the displayed number, i.e, the number of selected weighing machines, will be one-half the total number of weighing machines, i.e., n/2. The reason is that the combinations made up of n/2 machines are the largest in number, so that this grouping of combinations will likely afford combined weight values closest to the target value. The vibration amplitude and duration values set in this manner will be the appropriate values. When the setting of all weighing conditions has been completed, an actual combinatorial weighing operation may begin.

Thus, the foregoing conditions (namely the vibration amplitude and duration) for weighing out articles are set by a trial and error method and, whenever the kind of articles or target value changes, the operator must reset these conditions each time, using the digital or dial switches, in accordance with the article kind, target value and upper and lower limit values.

There are situations where it is desired to change the weighing conditions with some frequency, as when weighing out many different kinds of articles or when using a number of different target values. At times it is even desired to change the weighing conditions in accordance with the season and load, etc., even for articles of the same kind. Obviously, resetting the weighing conditions each time is a troublesome task requiring an experienced operator. Moreover, when there are a large number of weighing conditions to be set, there is a greater risk of error and a decline in productivity.

SUMMARY OF THE INVENTION

Accordingly, an object of the present invention is to provide a combinatorial weighing apparatus wherein weighing conditions are stored in memory beforehand and, when needed, are read selectively from the memory, enabling weighing conditions to be reset with facility and in a very short period of time.

According to the present invention, the foregoing object is attained by providing a combinatorial weighing apparatus having a data input unit for entering, as a set of reserved values, a number of weighing conditions depending on the kind of articles being weighed and the target value; a write control unit for writing the set of reserved values into a memory of a storage unit, the storage unit having a plurality of the memories in which different sets of reserved values may be written; and a read control unit which, in response to an input from the data input unit, selects a required set of reserved values from the corresponding memory of the storage unit, and applies prescribed ones of these values to a combinatorial computation control unit and feeder drive unit. The storage unit also includes a memory which, rather than storing reserved weighing conditions for future use, is for temporarily storing changed weighing conditions which are used but once following their entry.

Other features and advantages of the present invention will be apparent from the following description taken in conjunction with the accompanying drawings.

DESCRIPTION OF THE PREFERRED EMBODIMENT

Figure 2:
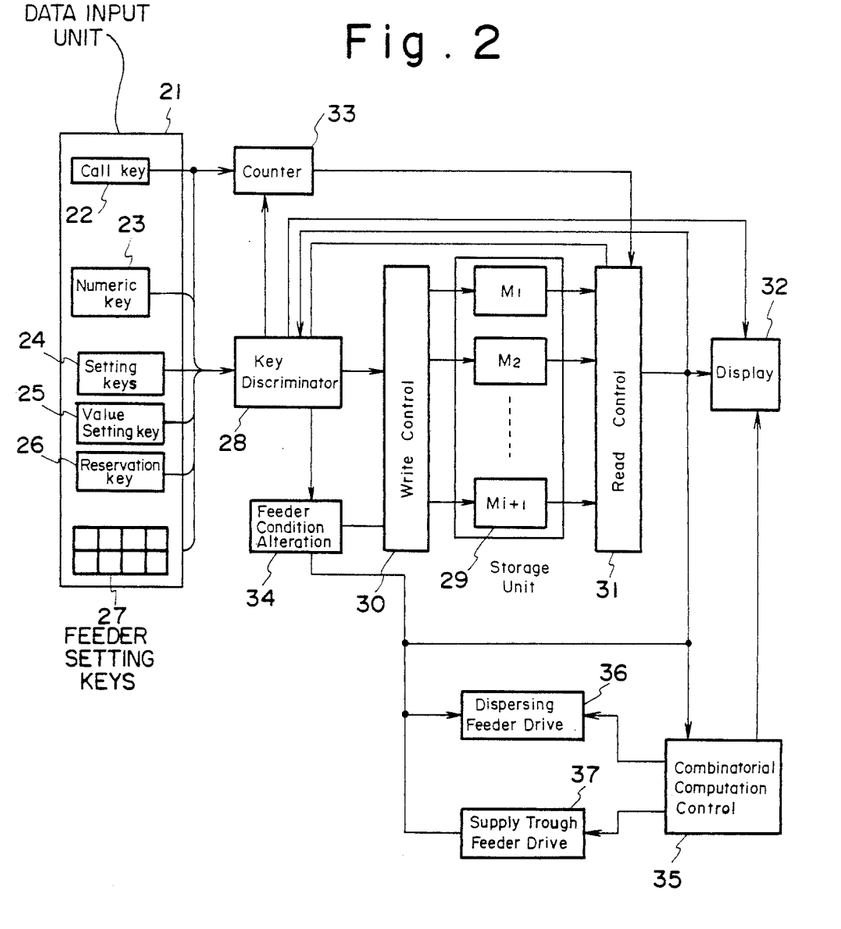
FIG. 2 is a block diagram of an embodiment of a combinatorial weighing apparatus in accordance with the present invention.

With reference to the block diagram of FIG. 2, a combinatorial weighing apparatus according to the present invention includes a data input unit 21 which comprises a number of keys mounted on a control box of the apparatus. These keys include a call key 22, a group of numeric keys 23 for setting numerical values, a setting key 24, a value setting key 25, a reservation key 26, and a plurality of feeder setting keys 27. The apparatus further includes a storage unit 29 comprising (i+1)-number of memories $M_1$, $M_2$, ... $M_i$, $M_{i+1}$, a write control unit 30, and a read control unit 31. A key discriminating control unit 28 is provided between the data input unit 21 and the write control unit 30, for discriminating which of the aforementioned keys have been pressed. The write control unit 30, in response to keys pressed on the data input unit 21, writes set weighing conditions into prescribed ones of the memories $M_1$ through $M_{i+1}$ of the storage unit 29. The read control unit 31, in response to the keys pressed on the data input unit 21, reads weighing conditions from designated ones of the memories $M_1$ through $M_{i+1}$. Also provided are a display unit 32, a counter 33, a feeder operating condition varying unit 34, a combinatorial computation control unit 35, a dispersing feeder drive unit 36, and a supply trough feeder drive unit 37.

The data input unit 21 is used to enter the target value of a combinatorial weighing operation, the upper and lower limit values for defining the allowable limits of the weighing operation, and weighing conditions (such as the vibration amplitude and time of each of the feeders) for controlling the quantity of articles supplied by the feeders. The entered values are stored, as reserved values, in the memories $M_1$ through $M_i$ of storage unit 29. When needed, the reserved values are called from the memory and serve as the basis for a combinatorial weighing operation. As an example, assume that articles of a certain kind are to be weighed and packaged to give 200 g of the articles. In this case, the entered target value is 200.0 g. Suitable upper and lower limits in this case will be 6 g and 0 g, respectively. Accordingly, the combinatorial weighing apparatus will weigh out and discharge article batches each weighing between 200.0 g and 206.0 g. Ten levels are available for the amplitude of vibration of the dispersing feeder and supply trough-type feeders described earlier. These levels correspond to numeric keys "0" through "9" of the numeric key group 23, and pressing one of these keys will set the corresponding amplitude of vibration; the higher the number of the pressed key, the larger the amplitude. Likewise, ten levels are available for the duration of vibration of the dispersing feeder and supply trough-type feeders. These levels correspond to numeric keys "0" through "9" of the numeric key group 23, and pressing one of these keys will set the corresponding duration of vibration; the higher the number of the pressed key, the longer the duration of vibration. It should be noted that the amount of articles supplied by the feeders will differ, even for the same amplitude and duration of vibration, depending upon the unit weight and shape of the articles. Therefore, amplitude and duration are decided initially based on trial and experience. The procedures for reserving values, calling values and changing the feeder operating conditions will now be described with reference to the flowcharts. We will assume the condition i=10.

First, to reserve or register values (FIG. 3), the operator presses the reservation key 26 on the data input unit 21. The key discriminating control unit 28 responds by instructing the start of a reservation operation, and the display unit 32 responds by presenting an appropriate display indicative of the reservation mode. Next, the operator enters any number between "1" and "10" using the numeric keys 23, and then presses the setting key 24. This enters a reservation number, which corresponds to the pressed numeric key, into the storage unit 29. As result, the old target value set at this number is displayed on the display unit 32 through the read control unit 31. For example, if the target value set previously was 200 g, the display unit 32 will display the numerical value "200". If the old target value is to be used without change, then the operator presses the setting key 24 again, whereupon the key discriminating control unit 28 and write control unit 30 cooperate to write the old target value into whichever of the ten memories $M_1$ through $M_{10}$ of the storage unit 29 corresponds to the reservation number. When the old target value is to be changed, the operator goes to the numeric keys 23, enters the numerical value corresponding to the new target value, and presses the setting key 24. In response, the key discriminating control unit 28 and write control unit 30 cooperate to write the new target value into whichever of the memories ($M_1$ through $M_{10}$) of the storage unit 29 corresponds to the reservation number. Next, the display unit 32 displays the old upper limit value set previously at the reservation number. If no change is to be made, then the operator presses the setting key 24, causing the key discriminating control unit 28 and write control unit 30 to write the old upper limit value back into whichever of the ten memories ($M_1$ through $M_{10}$) of the storage unit 29 corresponds to the reservation number. When the old upper limit value is to be changed, the operator uses the numeric keys 23 to enter the numerical value corresponding to the new upper limit value and presses the setting key 24. In response, the key discriminating control unit 28 and write control unit 30 cooperate to write the new upper limit value into whichever of the memories ($M_1$ through $M_{10}$) of the storage unit 29 corresponds to the reservation number. The same procedure is followed to enter a lower limit value although, in most cases, the target value is set as the lower limit value in order to avoid a weight shortfall which would be likely to result in complaints from the angry shopper. This is the approach taken in the illustrated embodiment, so that no additional steps are required of the operator to enter the lower limit value.

Figure 3:
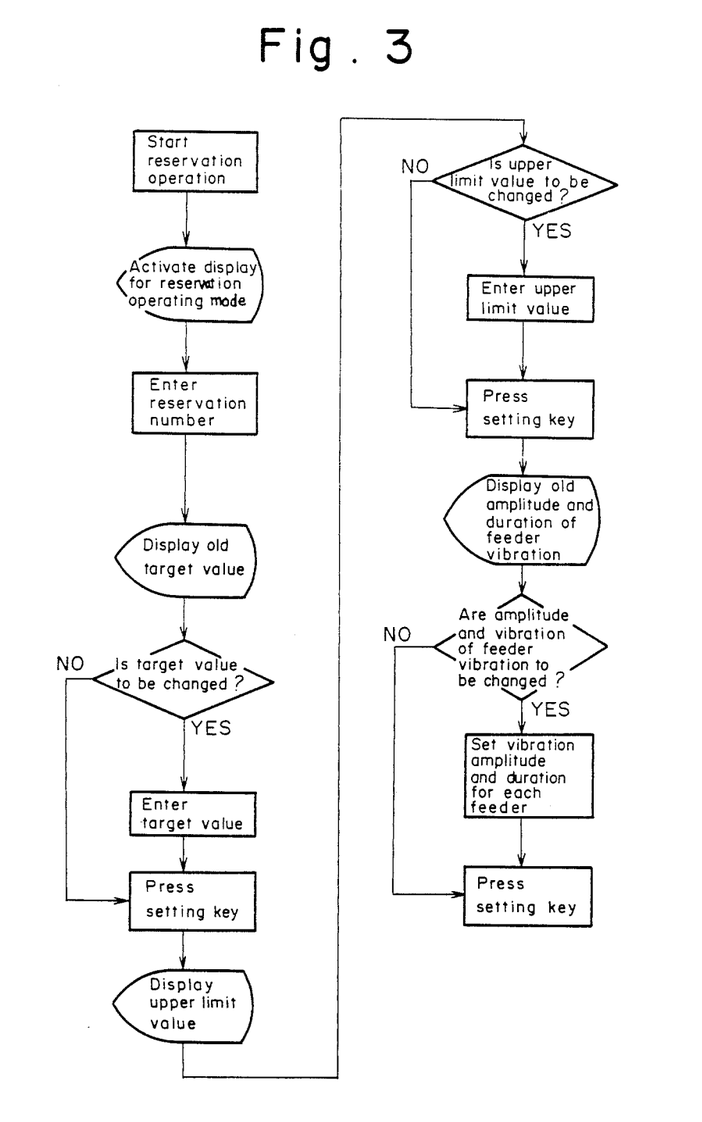
FIG. 3 is a flowchart illustrating the steps for registering values in memory.

Next, the display unit 32 displays the old, previously set values of feeder vibration amplitude and duration. If no change is required, then the operator presses the setting key 24, causing the key discriminating control unit 28 and write control unit 30 to write the old amplitude and duration back into whichever memory of the storage unit 29 corresponds to the reservation number. When the amplitude and duration of vibration are to be changed, the operator uses the numeric keys 23 to enter a four-digit number, in which the digits correspond to the amplitude of dispersing feeder vibration, the amplitude of supply trough feeder vibration, the duration of dispersing feeder vibration, and the duration of supply trough feeder vibration, respectively, the digits being entered in the order mentioned. The operator then presses the setting key 24, in response to which the key discriminating control unit 28 and write control unit 30 write the new amplitude and duration values for each feeder into whichever memory of the storage unit 29 corresponds to the reservation number. This completes the reservation operation with respect to one reservation number.

By successively changing the reservation number and repeating the foregoing steps, weighing conditions can be stored in all ten of the memories $M_1$ through $M_{10}$ corresponding to the entered reservation numbers. In a case where a reservation operation is to be discontinued in mid-course, the operator presses the reservation key 26 again. This will update the particular memory with the information entered up to the last operation of the setting key. By way of example, in a case where only the target value is to be changed at a certain reservation number, the operator, following the reservation procedure, enters the desired target value by using the numeric keys 23 and presses the setting key 24 as before, but then presses the reservation key 26. This terminates the reservation operation and updates only the target value.

After the reservation process, the desired values registered in the storage unit 29 may be called from the corresponding memory, in a manner later described. In this case, the target value and upper limit value will be delivered to the combinatorial computation control unit 35, the amplitude and duration of the dispersing feeder vibration will be delivered to the dispersing feeder drive unit 36, and the amplitude and duration of the trough feeder vibration will be delivered to the supply trough feeder drive unit 37.

Figure 4:
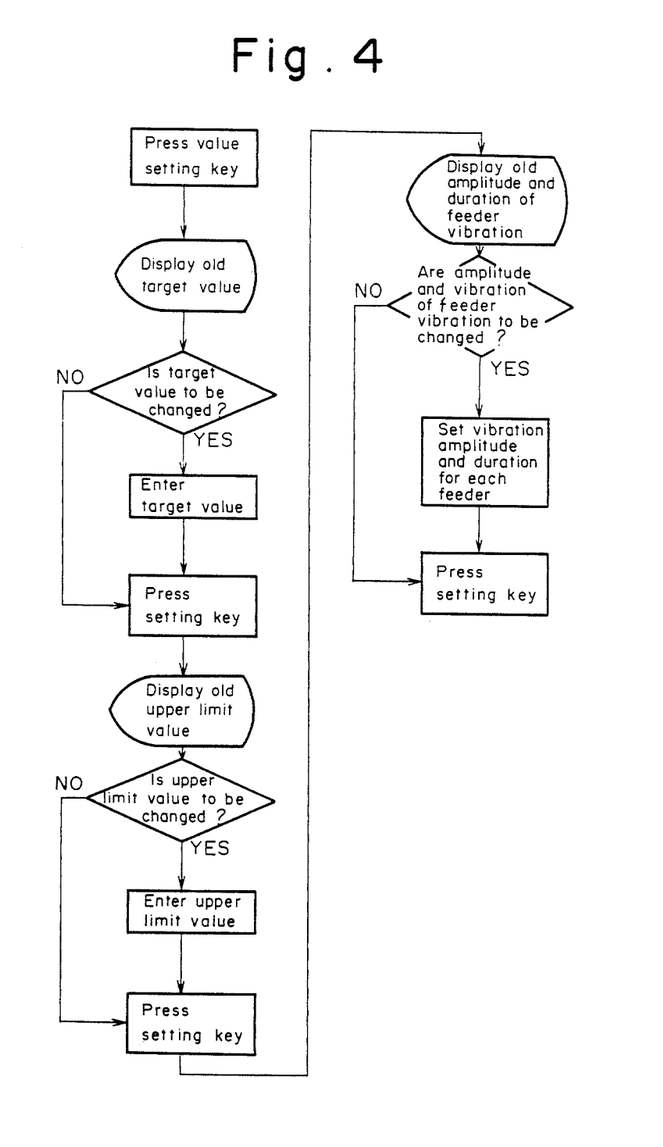
FIG. 4 is a flowchart illustrating a setting procedure performed through use of a value setting key.

Thus, the conditions for weighing out articles are set and registered, through the foregoing reservation procedure, in the i-number (i=10 in the illustrated embodiment) of memories ($M_1, M_2, \ldots M_{10}$) of the storage unit 29. The (i+1)th memory, namely memory $M_{11}$, is not for the purpose of storing reserved weighing conditions for future use. Rather, memory $M_{11}$ is for temporarily storing changed weighing conditions which are used only once following their entry. As will be apparent from the flowchart of FIG. 4, the procedure for setting weighing conditions in memory $M11$ is almost the same as that for reserving values. The only difference is that instead of starting out by pressing the reservation key 26, the value setting key 25 is pressed first, and there is no need to enter a reservation number. The prescribed weighing conditions may be stored in the memory $M_{11}$ by following the remaining steps described above for the reservation of values (FIG. 3). After the values have been set in memory $M_{11}$, they may be called from this memory (as described below). In this case, the target value and the upper limit value will be delivered to the combinatorial computation control unit 35, the amplitude and duration of the dispersing feeder vibration will be delivered to the dispersing feeder drive unit 36, and the amplitude and duration of the trough feeder vibration will be delivered to the supply trough feeder drive unit 37. To set the combinatorial weighing apparatus into operation, the operator presses a start key, not shown.

Figure 5:
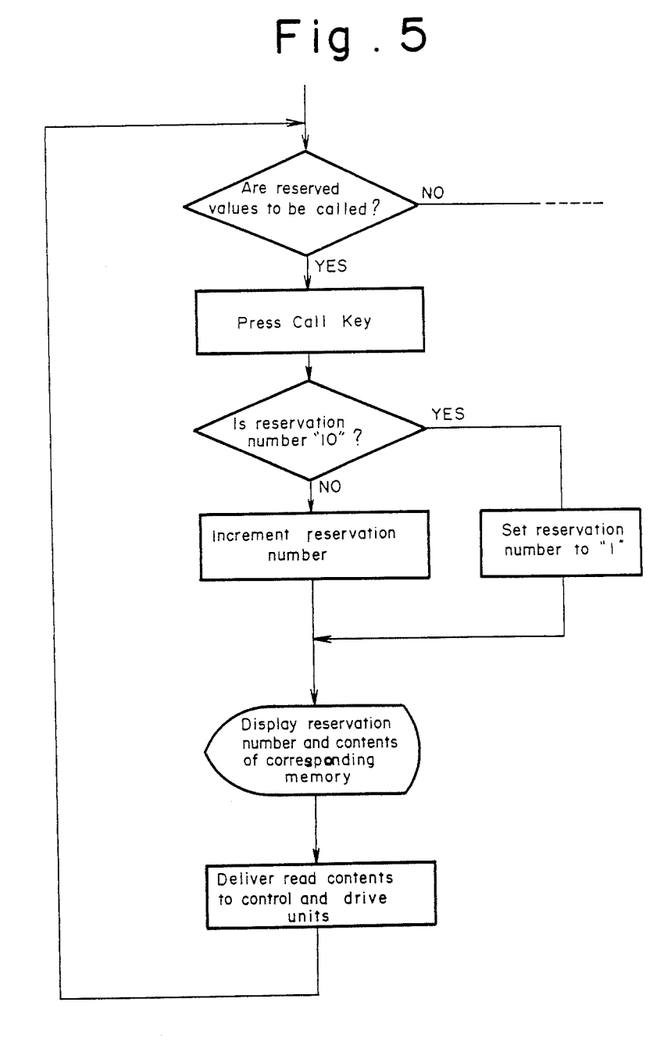
FIG. 5 is a flowchart illustrating the steps for a call operation.

The procedure for calling weighing conditions from memory will now be described with reference to FIG. 2 and the flowchart of FIG. 5. The operator begins by pressing the call key 22 on the data input unit 21 of the control box a desired number of times. Each time the key 22 is pressed, the counter 33 is incremented, and its state represents a reservation number. The arrangement is such that, when the reservation number in the counter 33 reaches the value "10" and the operator presses the call key 22 one more time, the initial reservation number "1" is called, there being no reservation number "11". In other words, reservation numbers from "1" to "10" are called in cyclic fashion by pressing the call key 22. The output of the counter 33 is a call command indicative of a reservation number. The reservation number call command is applied to the read control unit 31, which responds by reading the weighing conditions out of the memory in the storage unit 29 which corresponds to the commanded reservation number. These conditions, i.e., numerical values, are displayed by the display unit 32. Among the weighing conditions read out by the read control unit 31, the target value and upper limit value are delivered to the combinatorial control unit 35, the amplitude and duration of dispersing feeder vibration are delivered to the dispersing feeder drive unit 36, and the amplitude and duration of the supply trough feeder are delivered to the supply trough feeder drive unit 37.

Thus, by reserving a set of weighing conditions, all that need be done when a combinatorial weighing operation is to be performed at some future time, is to call the reserved values from memory to set the weighing apparatus in accordance with these values. In practice, the call operation is performed when the weighing apparatus is idle. When the desired set of weighing conditions has been called, a start key (not shown) is pressed to set the weighing apparatus into operation.

The operating conditions of the feeders can be altered by changing the amplitude and duration of the dispersing feeder vibration as well as the amplitude and duration of the supply trough feeder vibration. An example will now be described with reference to FIG. 2 and the flowchart of FIG. 6.

Figure 6:
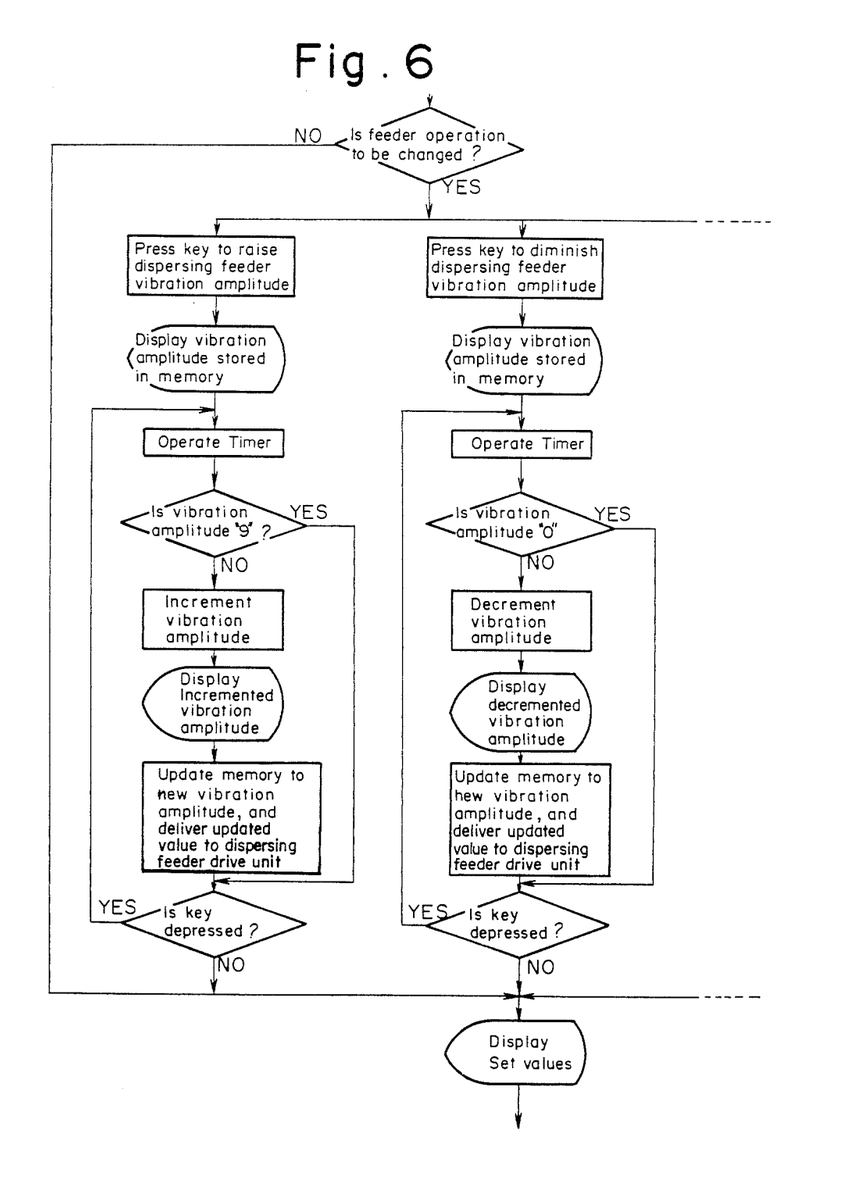
FIG. 6 is a flowchart illustrating the steps for changing the amplitude of vibration of the dispersing feeder.

Assume that the amplitude of dispersing feeder vibration is to be increased. Using the feeder setting keys 27, the operator presses a key for increasing the amplitude of vibration of the dispersing feeder. This sends the corresponding command to the feeder operating condition varying unit 34' via the key discriminating control unit 28' and causes the display unit 32 to display the amplitude stored in memory. If the operator holds the amplitude-increasing key depressed, the action of a timer (not shown) will increment the amplitude of vibration, the incremented amplitude will be displayed by the display unit 32, the memory will be updated to the new amplitude, and the updated amplitude will be delivered as an output to the dispersing feeder drive unit 36. The foregoing operation can be repeated by holding the above-mentioned key depressed, allowing the amplitude of vibration to be incremented up to a maximum value of "9". If the amplitude of dispersing feeder vibration is to be diminished, then the operator presses a key for decreasing the amplitude of vibration of the dispersing feeder. This sends the corresponding command to the feeder operating condition varying unit 34' via the key discriminating control unit 28' and causes the display unit 32 to display the amplitude stored in memory. If the operator holds the amplitude-decreasing key depressed, the action of the timer will decrement the amplitude of vibration, the decremented amplitude will be displayed by the display unit 32, the memory will be updated to the new amplitude, and the updated amplitude will be delivered as an output to the dispersing feeder drive unit 36. The foregoing operation can be repeated by holding the above-mentioned key depressed, allowing the amplitude of vibration to be decremented down to a minimum value of "0".

The duration of dispersing feeder vibration, as well as the amplitude and duration of supply trough feeder vibration, is altered in a manner similar to that described above.

The feeders may have their operating conditions changed in the above-described manner for the following reason. Specifically, unsatisfactory weighing operations, in which articles are weighed out in excess or inadequate amounts, frequently occur because of fluctuations in article lot and working environment, while combinatorial weighing based on the reserved values is in progress. In such cases it is necessary to finely adjust the amount of articles supplied by the feeders in order to restore the weighing operation to a normal state.

It should be noted that the present invention is not limited to the illustrated embodiment. For example, special keys corresponding to the available reservation numbers can be provided on the control box, so that weighing conditions can be called from a storage unit memory corresponding to one of the pressed keys, thereby setting the weighing apparatus to these conditions. An arrangement is also possible wherein a reservation number may be entered from the numeric keys to read weighing conditions out of the storage unit memory corresponding to the entered reservation number, thereby setting the weighing apparatus to these conditions.

In accordance with the present invention as described and illustrated hereinabove, when it is necessary to reset weighing conditions whenever there is a change in the kind of article being weighed or in the target value, the resetting operation can be performed easily and in a short period of time, merely by calling the desired weighing conditions from memory, where they have been registered in advance by the above-described reservation procedure. Since the desired weighing conditions can be called selectively once they have been registered, there is little possibility that values will be set erroneously, even if there are a large number of weighing conditions to be set, and even if the operator is lacking in experience. Accordingly, a large variety of articles can be weighed out based on numerous target values with a much higher degree of operability and productivity.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing apparatus having feeders, a plurality of controlled units and a plurality of weighing machines for performing a combinatorial weighing operation, by supplying the weighing machines with articles to be weighed via the feeders, computing combinations of weight values provided by the weighing machines, obtaining a combination of weight values giving a total combined weight value equal to target value or closest to the target value within preset allowable limits, and discharging the articles from those weighing machines corresponding to the combination of weight values obtained, said apparatus comprising:

data input means for entering, as plural sets of reserved values, weighing conditions necessary for combinatorial weighing, including target values for the combinatorial weighing operation, upper and lower limit values for defining the preset allowable limits, and vibration amplitudes and operation time periods for the feeders;

storage means including a plurality of memories for storing respective ones of the plural sets of reserved values;

write control means for writing the plural sets of reserved values into respective ones of the memories of said storage means; and read control means for reading a required set of reserved values out of said storage means and for delivering said set of reserved values to the plurality of controlled units.

2. The combinatorial weighing apparatus according to claim 1, wherein the plurality of controlled units includes:

a combinatorial computation control unit, operatively connected to said read control means, for controlling the combinatorial computations; and a feeder control drive unit, operatively connected to said read control means, for controlling the feeding of articles.

3. The combinatorial weighing apparatus according to claim 1, wherein said storage means further includes a memory for temporarily storing altered weighing conditions for temporary use.

4. The combinatorial weighing apparatus according to claim 2, wherein said data input means includes input keys for altering the reserved values which are indicative of weighing conditions, and for updating whichever of said memories stores said reserved values, by the altered values, even when combinatorial weighing based on the reserved values is in progress.

5. A combinatorial weighing apparatus for performing a combinatorial weighing operation and having a plurality of hoppers for storing weighed batches of articles which are fed to the hoppers by at least one feeder, comprising:

a data input unit for entering sets of reserved values, each of the sets of reserved values corresponding to a particular set of weighing conditions for combinatorial weighing, including target values for the combinatorial weighing operation, upper and lower limit values for defining preset allowable limits, and vibration amplitudes and operation time periods for the at least one feeder;

storage means for storing the sets of reserved values, said storage means including a plurality of memories for storing respective ones of the sets of reserved values;

a combinatorial computation control unit, operatively connected to said storage means, for receiving a selected one of the sets of reserved values which is read out of said storage means, for performing combinatorial computation in accordance with the selected set of reserved values and for providing a feeder drive signal; and feeder drive means, operatively connected to said combinatorial computation control unit, for driving the at least one feeder to feed articles to the hoppers in accordance with the feed drive signal.

6. The combinatorial weighing apparatus according to claim 5, wherein the at least one feeder includes a dispersing feeder and a supply trough feeder.

7. A combinatorial weighing method for use with a plurality of weighed batches of articles which are fed to hoppers by feeders, comprising the steps of:

(a) entering, as plural sets of reserved values, sets of weighing conditions necessary for different types of combinatorial weighing, said step (a) including entering, for each of the sets of reserved values, a target weight value, upper and lower limit values for defining preset allowable limits for the combinatorial weighing, and values indicative of the amplitude and duration of feeder vibration;

(b) storing the plural sets of reserved values in respective memories;

(c) reading a selected one of the plural sets of reserved values from the corresponding one of the memories in accordance with the type of combinatorial weighing which is to take place; and (d) controlling combinatorial computation and the feeding of articles to the hoppers in dependence upon the set of weighing conditions specified by the selected set of reserved values.

* * * * *

UNITED STATES PATENT AND TRADEMARK OFFICE
CERTIFICATE OF CORRECTION

PATENT NO. : 4,553,616
DATED : NOVEMBER 19, 1985
INVENTOR(S) : SETSUO HAZE

It is certified that error appears in the above-identified patent and that said Letters Patent is hereby corrected as shown below:

FRONT PAGE [56] Assistant Examiner, "Fred L. Kompe" should be --Fred L. Kampe--.

Col. 7, line 25, "34'" should be --34,--;
       line 26, "28'" should be --28,--;
       line 41, "34'" should be --34,--;
       line 42, "28'" should be --28,--.

Col. 8, line 44, after "to" insert --a--.

Signed and Sealed this

Twenty-fifth Day of February 1986

[SEAL]

Attest:

DONALD J. QUIGG

*Attesting Officer*  *Commissioner of Patents and Trademarks*